US012181702B2

(12) United States Patent
Martinez et al.

(10) Patent No.: US 12,181,702 B2
(45) Date of Patent: Dec. 31, 2024

(54) DISTRIBUTED LIGHT PROJECTION DEVICE

(71) Applicant: Commissariat à l'Énergie Atomique et aux Énergies Alternatives, Paris (FR)

(72) Inventors: Christophe Martinez, Grenoble (FR); Daivid Fowler, Grenoble (FR); Basile Meynard, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 0 days.

(21) Appl. No.: 17/153,596

(22) Filed: Jan. 20, 2021

(65) Prior Publication Data

US 2021/0231861 A1 Jul. 29, 2021

(30) Foreign Application Priority Data

Jan. 24, 2020 (FR) ...................................... 2000694

(51) Int. Cl.
*F21V 8/00* (2006.01)
(52) U.S. Cl.
CPC ........... *G02B 6/0038* (2013.01); *G02B 6/006* (2013.01); *G02B 6/0076* (2013.01)
(58) Field of Classification Search
CPC .... G02B 6/0038; G02B 6/006; G02B 6/0076; G02B 6/0075
See application file for complete search history.

(56) References Cited

U.S. PATENT DOCUMENTS

| 6,109,750 A   * | 8/2000  | Mayer ................. H04N 13/363 353/7 |
| 7,496,241 B1 * | 2/2009 | Reneker ................ G01C 11/02 382/260 |
| 11,025,871 B1 * | 6/2021 | Magoz .................. G09G 3/001 |
| 2008/0165399 A1* | 7/2008 | Ushiro .................. G02B 5/203 359/15 |
| 2009/0129116 A1 | 5/2009 | Kim et al. |
| 2009/0231358 A1* | 9/2009 | Ellwood, Jr. ........ G03B 21/005 345/619 |
| 2013/0343705 A1 | 12/2013 | Vermeulen et al. |
| 2016/0128553 A1* | 5/2016 | Geng ....................... A61B 1/05 600/111 |

(Continued)

FOREIGN PATENT DOCUMENTS

| CN | 104460115 A * | 3/2015 | ............. G02B 27/22 |
| CN | 111051938 A * | 4/2020 | ......... G02B 27/0172 |

(Continued)

OTHER PUBLICATIONS

Preliminary Search Report for French Application No. 2000694, dated Sep. 9, 2020.

(Continued)

*Primary Examiner* — Fatima N Farokhrooz
(74) *Attorney, Agent, or Firm* — Wolf, Greenfield & Sacks, P.C.

(57) ABSTRACT

A Distributed light projection device, including: one or a plurality of waveguides; and above each waveguide, a plurality of extraction cells coupled to distinct portions of the guide, each extraction cell including first and second stacked diffraction gratings.

17 Claims, 5 Drawing Sheets

(56) References Cited

U.S. PATENT DOCUMENTS

| | | | |
|---|---|---|---|
| 2016/0134083 A1* | 5/2016 | Dallesasse | H01S 5/18333 |
| | | | 372/50.11 |
| 2017/0205618 A1* | 7/2017 | Basset | G02B 23/26 |
| 2018/0233878 A1* | 8/2018 | Leonardo | G03B 21/2033 |
| 2018/0323581 A1* | 11/2018 | Stojetz | H01S 5/0078 |
| 2019/0324186 A1* | 10/2019 | Tan | G02B 6/0055 |
| 2019/0339449 A1* | 11/2019 | Shipton | G02B 27/4272 |
| 2020/0044418 A1* | 2/2020 | Nishioka | H01S 5/423 |
| 2020/0116995 A1* | 4/2020 | Chi | G02B 6/0035 |
| 2020/0117005 A1* | 4/2020 | Chi | G02B 27/0172 |
| 2020/0209627 A1* | 7/2020 | Roggatz | G02B 27/0977 |
| 2021/0033857 A1* | 2/2021 | Waldern | G02B 26/0808 |
| 2021/0103140 A1* | 4/2021 | Gao | G02B 26/123 |
| 2021/0124170 A1* | 4/2021 | Lee | G02B 6/0035 |

FOREIGN PATENT DOCUMENTS

| | | | | |
|---|---|---|---|---|
| JP | 2002156519 A | * | 5/2002 | |
| WO | 2019/171806 A1 | | 9/2019 | |
| WO | WO-2019179136 A1 | * | 9/2019 | G02B 27/0075 |

OTHER PUBLICATIONS

Raval et al., Unidirectional waveguide grating antennas with uniform emission for optical phased arrays. Optics Letters. Jul. 1, 2017;42(13):2563-6.

Martinez et al., See-through holographic retinal projection display concept. Optica. Oct. 20, 2018;5(10):1200-9.

* cited by examiner

DISTRIBUTED LIGHT PROJECTION DEVICE

TECHNICAL BACKGROUND

The present disclosure generally concerns optical devices, and more particularly aims at a distributed light projection device.

PRIOR ART

Patent application US2015/0370073, previously filed by the applicant, and the article entitled "See-through holographic retinal projection display concept", of Christophe Martinez et al. (Optica, Vol. 5, Issue 10, pp. 1200-1209 (2018)), describe embodiments of a retinal projection device capable of being integrated in an ocular glass. This device comprises one or a plurality of laser sources distributed at the surface of the glass by a network of waveguides. The guided light is extracted at different points of the surface of the glass by extraction cells, and projected onto a user's retina.

To improve the quality of the perceived images, it would be desirable for the intensity of the light extracted by the different extracted cells to be uniform over the entire surface of the glass. For this purpose, the extraction coefficient, that is, the percentage of the guided light extracted by each extraction cell, should increase as the distance to the input end of the guides increases.

More generally, these exist various applications in which it would be desirable to be able to extract light in different regions of a waveguide, with extraction coefficients varying according to a predefined profile along the guide.

SUMMARY

Thus, an embodiment provides a distributed light projection device, comprising:
one or a plurality of waveguides; and
above each waveguide, a plurality of extraction cells coupled to different portions of the guide, each extraction cell comprising first and second stacked diffraction gratings.

According to an embodiment, different extraction cells have different offset values between the first and second diffraction gratings, whereby the different cells have different extraction coefficients.

According to an embodiment, for each waveguide, the different extraction cells coupled to the guide have offset values between the first and second diffraction gratings decreasing as the distance to an input end of the guide increases, whereby the different cells have extraction coefficients increasing as the distance to the input end of the guide increases.

According to an embodiment, in each extraction cell, the first and second diffraction gratings have the same pitch.

According to an embodiment, the first diffraction gratings of the different cells have the same pitch, and the second diffraction gratings of the different cells have the same pitch.

According to an embodiment, the device comprises a plurality of waveguides, the first and second diffraction gratings of an extraction cell of a waveguide laterally extending opposite the other waveguides and forming extraction cells of the other waveguides.

According to an embodiment, each waveguide is a monomode waveguide.

Another embodiment provides an image projection device, comprising a distributed light projection device such as defined hereabove, and, opposite each light extraction cell of the distributed light projection device, a holographic element for orienting the light extracted by the cell.

According to an embodiment, the device further comprises, opposite each extraction cell, a controllable cell activation and deactivation element.

According to an embodiment, the device comprises no controllable elements for activating or deactivating the extraction cells.

Another embodiment provides an optical phase control grating comprising a distributed light projection device such as defined hereabove, and, upstream of this device, a device of modification of the phase of the light injected into the waveguides of the device.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DESCRIPTION OF THE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the following description manly concerns the forming of a distributed projection device comprising one or a plurality of waveguides and, coupled to each waveguide, a plurality of extraction cells enabling to extract light from the guide according to a predefined intensity profile, for example, but not necessarily, a uniform profile. The various applications capable of taking advantage of such a projection device have not been detailed. It should in particular be noted that the application of such a device to a retinal projection device described in relation with the above-mentioned patent application US2015/0370073, and with Christophe Martinez et al.'s above-mentioned article, which is incorporated herein by reference, is within the abilities of those skilled in the art on reading of the present disclosure. Further, the manufacturing methods capable of being implemented to form the described structures have not been detailed, the described embodiments being compatible with usual integrated optical component forming methods.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings, it being understood that, in practice, the described devices may be oriented differently.

Unless specified otherwise, the expressions "around", "approximately", "substantially" and "in the order of" signify within 10%, and preferably within 5%.

Figure 1:
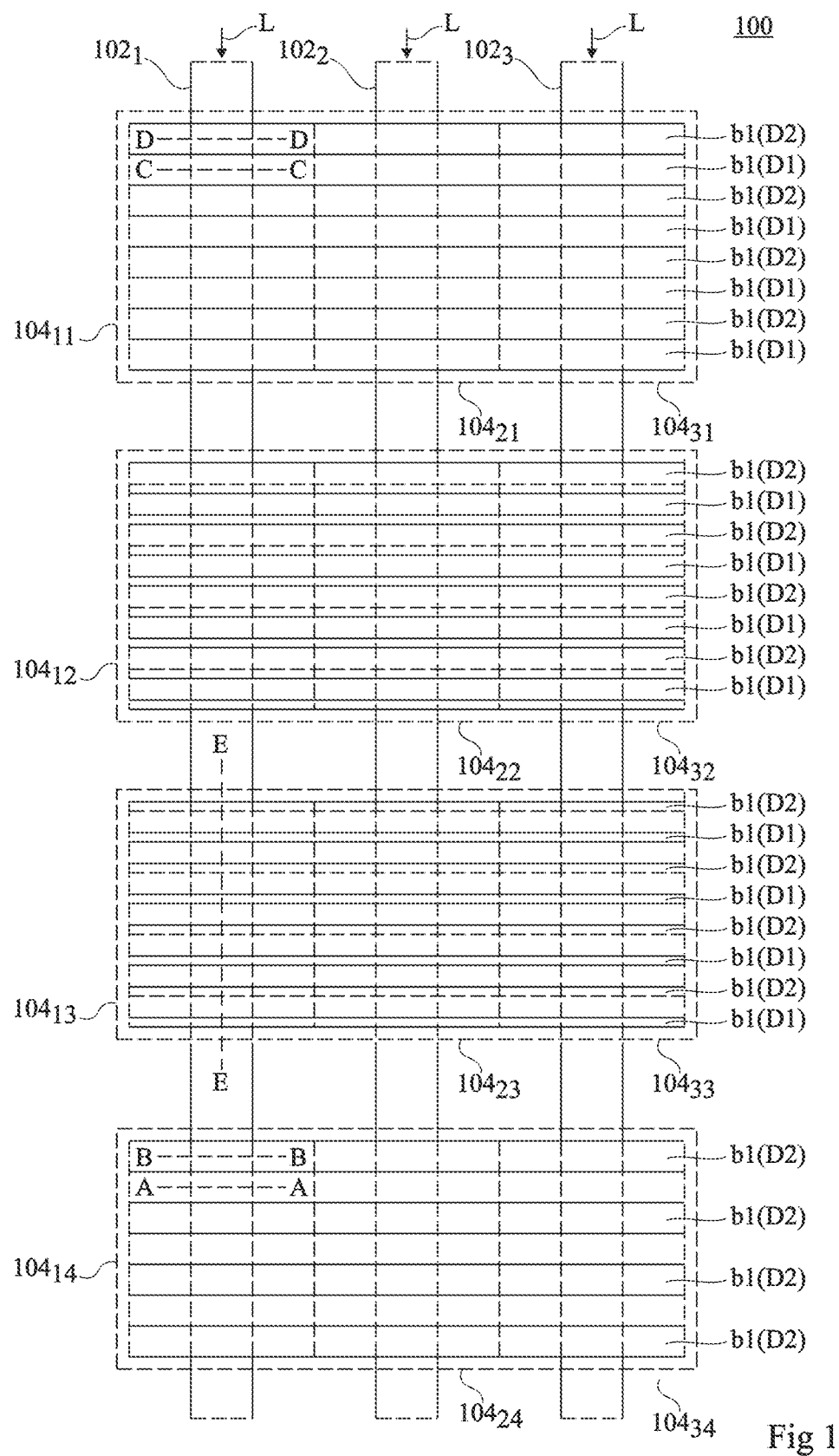
FIG. 1 is a top view schematically illustrating an example of a distributed light projection device according to an embodiment.
Figure 2:
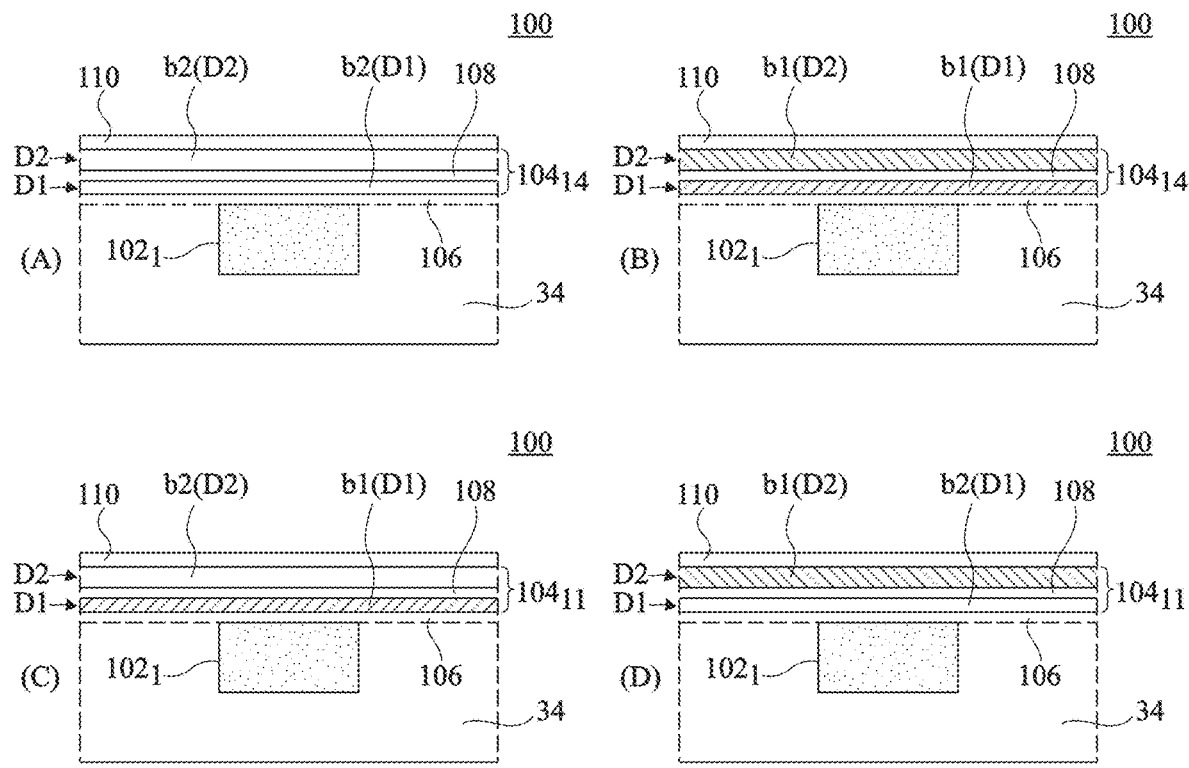
FIG. 2 shows four transverse cross-section views of the device of FIG. 1.
Figure 3:
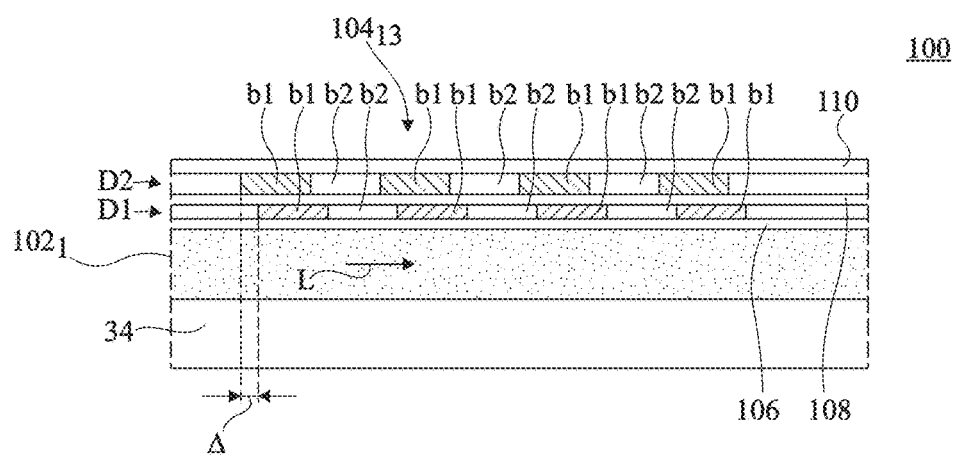
FIG. 3 shows a longitudinal cross-section of the device of FIG. 1.

FIG. 1 is a top view schematically illustrating an example of a distributed light projection device 100 according to an embodiment. FIG. 2 shows four transverse cross-section views (A), (B), (C), and (D) of device 100, respectively along the four cross-section planes A-A, B-B, C-C, and D-D of FIG. 1. FIG. 3 shows a longitudinal cross-section view (E) of device 100, along the cross-section plane E-E of FIG. 1.

The device 100 of FIGS. 1 to 3 comprises N optical waveguides $102_i$, N being an integer greater than or equal to 1 and i being an integer in the range from 1 to N. In FIG. 1, three waveguides $102_1$, $102_2$, and $102_3$ have been shown. Only waveguide $102_1$ is shown in the cross-section views of FIGS. 2 and 3. Waveguides $102_i$ are formed inside or on top of a transparent substrate 34 (not shown in FIG. 1), for example, a glass substrate. It should be noted that in the present disclosure, transparent means a material transparent to the wavelength or to the wavelengths of the projected light. Each waveguide $102_i$ has the shape of a band, for example, with a substantially rectangular transverse cross-section. In the shown example, waveguides $102_i$ have the shape of parallel rectilinear bands. As a variant, waveguides $102_i$ may have the shape of curved bands, and/or not be parallel to one another. Waveguides $102_i$ may have relatively significant lengths, for example, in the range from 0.1 mm to 10 cm, for example, from 0.5 mm to 5 cm. The density of waveguides $102_i$ may be relatively high. In particular, in top view, the distance between two neighboring waveguides $102_i$ may be relatively small, for example, smaller than 100 μm, for example, smaller than 10 μm, for example, smaller than 5 μm, for example, in the order of 1.5 μm.

Each waveguide $102_i$ is made of a transparent material having a first refraction index, for example, silicon nitride (SiN) having a refraction index in the order of 1.9, and is totally surrounded, on the side of its longitudinal surfaces, with a second transparent material having a refraction index smaller than the first index, for example, silicon dioxide ($SiO_2$) or glass having a refraction index in the order of 1.5. As a variant, guides $102_i$ may be made of silicon, surrounded by silicon dioxide. The described embodiments are not limited to these specific examples.

Waveguides $102_i$ are preferably monomode waveguides, that is, excited by a single propagation mode. As an example, in transverse cross-section, the largest dimension of each of waveguides $102_i$ does not exceed 2 μm.

In the shown example, waveguides $102_i$ are located in a same mid-plane approximately parallel to an upper surface of substrate 34. In other words, waveguides $102_i$ have respective longitudinal axes which are substantially coplanar and parallel to the upper surface of substrate 34, and have upper, respectively lower surfaces which are substantially coplanar and parallel to the upper surface of substrate 34.

In practice, each waveguide is coupled, at one of its ends, to a laser source (not shown), for example, having a controllable intensity, capable of injecting into the guide a light beam of constant orientation, capable of propagating in the guide. Different waveguides $102_i$ of the device may be coupled to a same laser source, or to distinct laser sources. In the example of FIG. 1, the main direction of light propagation in each waveguide has been shown by an arrow bearing reference L.

The device 100 of FIGS. 1 to 3 further comprises a light extraction device comprising, for each waveguide $102_i$, M extraction cells $104_{ij}$, M being an integer greater than or equal to 1 and j being an integer in the range from 1 to M, coupled to distinct areas of the upper surface of the guide. In FIG. 1, for each waveguide $102_i$, four extraction cells $104_{i1}$, $104_{i2}$, $104_{i3}$, and $104_{i4}$ have been shown. The M extraction cells $104_{ij}$ of each waveguide $102_i$ may be distributed, for example, but not necessarily, regularly, all along the length of the guide.

Each cell $104_{ij}$ is capable of extracting part of the light propagating in the underlying waveguide $102_i$ and of projecting this light towards the outside of device 100, particularly on the upper surface side of device 100.

In the example of FIGS. 1 to 3, for each waveguide $102_i$, different extractions cells $104_{ij}$ of the guide have different extraction coefficients, to ensure an extraction of the guided light according to a predefined intensity profile along the guide, for example, according to a uniform intensity profile. Extraction coefficient here means the ratio of the light energy extracted from the guide due to the interaction with the extraction cell to the guided light energy propagated by the guide immediately before the coupling area between the guide and the extraction cell. In the example of FIG. 1, the extraction coefficient is increasing as the distance to the input end of the guide increases. In other words, for each extraction cell $104_{ij}$ except for cell $104_{i1}$, the extraction coefficient of cell $104_{ij}$ is greater than that of cell $104_{ij-1}$, it being understood that extraction cells $104_{ij}$ are distributed along guide $102_i$ by order of increasing index j, starting from the input end of guide $102_i$.

According to an aspect of the embodiment of FIGS. 1 to 3, each extraction cell $104_{ij}$ comprises two stacked diffraction gratings D1 and D2. Each of gratings D1 and D2 is formed of an alternation of strips b1 of a transparent material having a first refraction index, called high index, and of strips b2 of a transparent material having a refraction index smaller than that of strips b1, called low index. The strips b1 of grating D1 may be made of the same material as the strips b1 of grating D2, for example, of silicon nitride, or of a different material. Similarly, the strips b2 of grating D1 may be made of the same material as the strips b2 of grating D2, for example, of silicon dioxide or of a polymer material, or of a different material.

In the shown example, in each of diffraction gratings D1 and D2, the strips b1 and b2 of the grating are arranged in a same mid-plane substantially parallel to the upper surface of the underlying waveguide $102_i$. In other words, the lower, respectively upper, surfaces of the strips b1 and b2 of each diffraction grating are substantially coplanar and parallel to the upper surface of the underlying waveguide $102_i$.

In this example, in each extraction cell $104_{ij}$, the strips b1 and b2 of the diffraction gratings D1 and D2 of the cell are, in top view, orthogonal to the longitudinal axis of the underlying waveguide $102_i$. The described embodiments are not limited to this specific case. Preferably, the strips b1 and b2 of the diffraction gratings D1 and D2 of the cell form, in top view, an angle in the range from −45° to +450 with the normal to the longitudinal axis of the underlying waveguide $102_i$.

For clarity, only the strips of high index b1 of gratings D1 and D2 have been shown in the top view of FIG. 1. In the cross-section views of FIGS. 2 and 3, the strips of high index b2 of gratings D1 and D2 have been hatched to be better distinguished from the strips of low index b2, which are not hatched.

In each extraction cell $104_{ij}$, diffraction gratings D1 and D2 each have a period (or pitch) in the order of or smaller than the wavelength of the light guided by the underlying waveguide $102_i$.

As an example, in each extraction cell $104_{ij}$, the periods of the diffraction gratings D1 and D2 of the cell are identical, to within manufacturing dispersions. Further, the periods of the diffraction gratings D1 and D2 of the extraction cells $104_{ij}$ coupled to a same waveguide $102_i$ may be identical, to within manufacturing dispersions. Preferably, the periods of the diffraction gratings D1 and D2 of the different extraction cells $104_{ij}$ of device 100 are identical, to within manufacturing dispersions. The provision of gratings D1 and D2 having the same pitch advantageously enables to simplify the manufacturing of the device.

As an example, in each extraction cell $104_{ij}$, the strips b1 of diffraction gratings D1 and D2 have the same width (in top view) and the strips b2 of diffraction gratings D1 and D2 have the same width (in top view), to within manufacturing dispersions. Further, the widths of the strips b1, respectively b2, of the extraction cells coupled to a same waveguide may be identical, to within manufacturing dispersions. Preferably, the widths of the strips b1, respectively b2, of the different extraction cells $104_{ij}$ of the device are identical to within manufacturing dispersions. The provision of gratings D1 and D2 having strips b1, respectively b2 of same width advantageously enables to simplify the manufacturing of the device. As a variant, the width of the strips b1 and b2 of a same grating D1 and/or D2 may be different.

In the example shown in FIGS. 2 and 3, gratings D1 and D2 have different thicknesses. As a variant, the thicknesses of gratings D1 and D2 may be identical or substantially identical.

In the example of FIGS. 1 to 3, in each extraction cell $104_{ij}$, grating D1 is separated from the upper surface of the underlying waveguide $102_i$ by a transparent layer 106 (not shown in FIG. 1), for example, made of silicon dioxide or of an adhesive polymer material. In the shown example, layer 106 is in contact, by its lower surface, with the upper surface of waveguide 102 and, by its upper surface, with the lower surface of diffraction grating D1. Layer 106 for example continuously extends above substantially the entire upper surface of substrate 34. Further, in this example, in each extraction cell $104_{ij}$, grating D2 is separated from grating D1 by a transparent layer 108 (not shown in FIG. 1), for example, made of silicon dioxide. In the shown example, layer 108 is in contact, by its lower surface, with the upper surface of diffraction grating D1 and, by its upper surface, with the lower surface of diffraction grating D2. Layer 108 for example continuously extends above substantially the entire upper surface of substrate 34. Further, in this example, a transparent layer 110 (not shown in FIG. 1), for example, made of silicon dioxide or of an adhesive polymer material, coats the upper surface of diffraction grating D2. In the shown example, layer 110 is in contact, by its lower surface, with the upper surface of diffraction grating D2. Layer 110 for example continuously extends above substantially the entire upper surface of substrate 34.

The thickness of layer 106 is for example in the range from 10 to 500 nm, for example, from 20 to 200 nm. The thickness of layer 108 is for example in the range from 5 to 100 nm, for example, from 10 to 50 nm. The thickness of grating D1 is for example in the range from 10 to 150 nm, for example, from 20 to 60 nm. The thickness of grating D2 is for example in the range from 10 to 500 nm, for example, from 50 to 150 nm.

In the example of FIGS. 1 to 3, a value of the offset $\Delta_{ij}$ (FIG. 3) between diffraction gratings D1 and D2 is varied to set the extraction coefficient of each cell $104_{ij}$. In other words, for each waveguide $102_i$, different extraction cells $104_{ij}$ of the guide have different offset values $\Delta_{ij}$ between the diffraction gratings D1 and D2 of the cell. In the shown example, offset value $\Delta_{ij}$ designates the distance, in top view, between an edge of a strip b1 of grating D1, and the corresponding edge (that is, the edge of a strip b1 facing the same end of waveguide $102_1$) closest to grating D2.

In the shown example, the offset $\Delta_{ij}$ between the gratings D1 and D2 of a same cell $104_{ij}$ is constant all along the length of the cell.

When offset $\Delta_{ij}$ is null (that is, when gratings D1 and D2 are in phase), the respective effects of diffraction gratings D1 and D2 of the cell tend to cumulate, which results in maximizing the light extraction. Conversely, when offset $\Delta_{ij}$ is high (that is, when gratings D1 and D2 are in phase opposition), the respective effects of diffraction gratings D1 and D2 of the cell tend to cancel, which results in minimizing the light extraction.

As an example, referring to views (A), (B), (C), and (D) of FIG. 2, gratings D1 and D2 and layers 106 and 108 may be sized so that the regions of the guide which are topped with a strip b1 of grating D1 and which are not topped with a strip b1 of grating D2, called regions C hereafter (corresponding to view (C) of FIG. 2), have, for the guided mode, an effective index $n_C$ substantially equal to the effective index $n_D$ of the regions of the guide which are topped with a strip b1 of grating D2 and which are not topped with a strip b1 of grating D1, called regions D hereafter (corresponding to view (D) of FIG. 2). Preferably, gratings D1 and D2 and layers 106 and 108 are sized so that the regions of the guide topped with a strip b1 of grating D1 and with a strip b1 of grating D2, called regions B hereafter (corresponding to view (B) of FIG. 2), and the regions of the guide which are not topped with a strip b1 of grating D1 and which are not topped with a strip b1 of grating D2, called regions A hereafter (corresponding to view (A) of FIG. 2), respectively have, for the guided mode, effective indices $n_B$ and $n_A$ such that average $(n_a+n_b)/2$ is substantially equal to average $(n_c+n_d)/2$.

In the shown example, offset $\Delta_{ij}$ is relatively significant in the extraction cell $104_{ij}$ closest to the input end of guide $102_i$, and tends to decrease as the distance to said input end of guide $102_i$ increases. As an example, offset $\Delta_{ij}$ is maximum, for example, equal to T/2 (where T designates the period of gratings D1 and D2) in the cell $104_{i1}$ closest to the input end of guide $102_i$, and is minimum, for example, null, in the cell $104_{iM}$ most distant from the end of guide $102_i$.

It will be within the abilities of those skilled in the art to adapt the values of the offset $\Delta_{ij}$ of extraction cells $104_{ij}$ along each guide $102_i$, according to the desired light extraction profile. Indeed, an advantage of the extraction cells $104_{ij}$ described in relation with FIGS. 1 to 3 is that one may, by varying the value of offset $\Delta_{ij}$, accurately modify the extraction coefficient of each cell.

In the shown example, the offset values $\Delta_{ij}$ of the extraction cells $104_{ij}$ of same rank j of the different waveguides $102_i$ are identical. More particularly, in this example, the strips b1 and b2 of the diffraction gratings D1 and D2 of the extraction cells $104_{ij}$ of same rank j of the different waveguides $102_i$ are common and each extend, with no discontinuity, above the N waveguides $102_i$ of the device. This simplifies the manufacturing of the device. This may further enable to increase the integration density of the guides. The described embodiments are however not limited to this specific case.

In the example of FIG. 1, in each extraction cell $104_{ij}$, each of gratings D1 and D2 comprises an alternation of four strips b1 of high index and of four strips b2 of low index. The described embodiments are of course not limited to this specific case. More generally, the number of repetitions of the elementary pattern of the grating (formed in this example by two consecutive strips b1 and b2) may be different from 4, for example, in the range from 1 to 100, for example, in the range from 5 to 20.

Further, in the example of FIG. 1, the extraction cells $104_{ij}$ coupled to a same waveguide $102_i$ are separate, that is, in top view, two consecutive cells $104_{ij}$ and $104_{ij+1}$ are separated by a portion of guide $102_i$ which is not topped by a diffraction grating. The described embodiments are however not limited to this specific case. As a variant, the extraction cells $104_{ij}$ coupled to a same waveguide $102_i$ may meet.

Embodiments of a distributed light projection device, enabling to accurately control the intensity profile of the projected light all along the length of the light extraction area has been described hereabove.

Non-limiting examples of applications capable of taking advantage of such a device will now be described.

Figure 4:
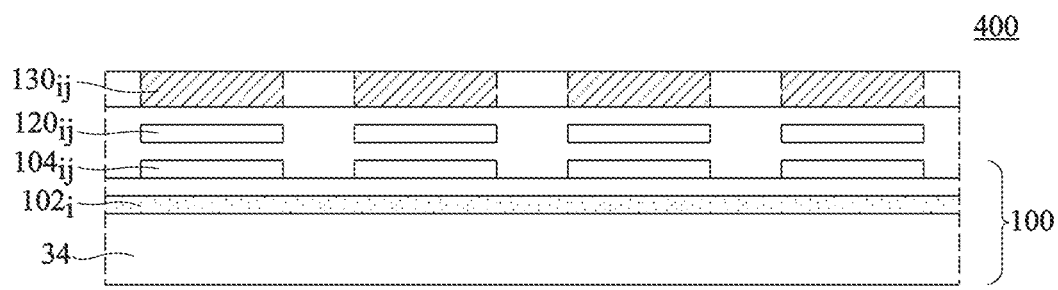
FIG. 4 is a longitudinal cross-section view schematically illustrating an example of an image projection using a distributed light projection device of the type described in relation with FIG. 1 to 3.

FIG. 4 is a longitudinal cross-section view schematically illustrating an example of an image projection device 400 using a distributed light projection device 100 of the type described in relation with FIGS. 1 to 3. Device 400 is for example a retinal projection device of the type described in further detail in above-mentioned patent application US2015/0370073 and/or in Christophe Martinez et al.'s above-mentioned article.

In the example of FIG. 4, image projection device 400 comprises, coupled to each extraction cell $104_{ij}$, a controllable switchable element $120_{ij}$ enabling to activate or deactivate the cell. When the cell is activated, it extracts part of the light propagating in the underlying waveguide $102_i$. When the cell is deactivated, it has no effect upon the light circulating in the guide.

In the example of FIG. 4, image projection device 400 further comprises, opposite each extraction cell $104_{ij}$, a holographic element $130_{ij}$ capable of orienting, in a desired projection direction, the light beam extracted from guide $102_i$ by cell $104_{ij}$. Holographic elements $130_{ij}$ may be transmissive or reflective holographic elements.

The device 400 of FIG. 4 enables to project any image, by varying the control to the active or inactive state of extraction cells $104_{ij}$ and the intensity of the laser source or sources supplying waveguides $102_i$.

The forming of control elements $120_{ij}$ and of holographic orientation elements $130_{ij}$ has not been detailed, embodiments of these elements being described in above-mentioned patent application US2015/0370073 and/or in Christophe Martinez et al.'s above-mentioned article.

Figure 5:
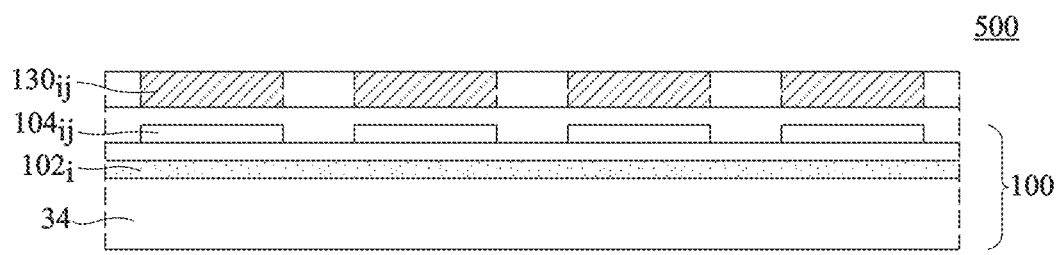
FIG. 5 is a longitudinal cross-section view schematically illustrating another example of an image projection device using a distributed light projection device of the type described in relation with FIGS. 1 to 3.

FIG. 5 is a longitudinal cross-section view schematically illustrating another example of an image projection device 500 using a distributed light projection device of the type described in relation with FIGS. 1 to 3.

The device 500 of FIG. 5 differs from the device 400 of FIG. 4 in that it comprises no elements $120_{ij}$ for controlling extraction cells $104_{ij}$. In other words, in the device 500 of FIG. 5, extraction cells $104_{ij}$ are always active.

Device 500 is a simplified device, enabling to only display a static image, for example, a pictogram, previously recorded in the holographic layer containing elements $130_{ij}$. The display or not of the prerecorded image is controlled by varying the activation or not of the laser source supplying the waveguides.

Figure 6:
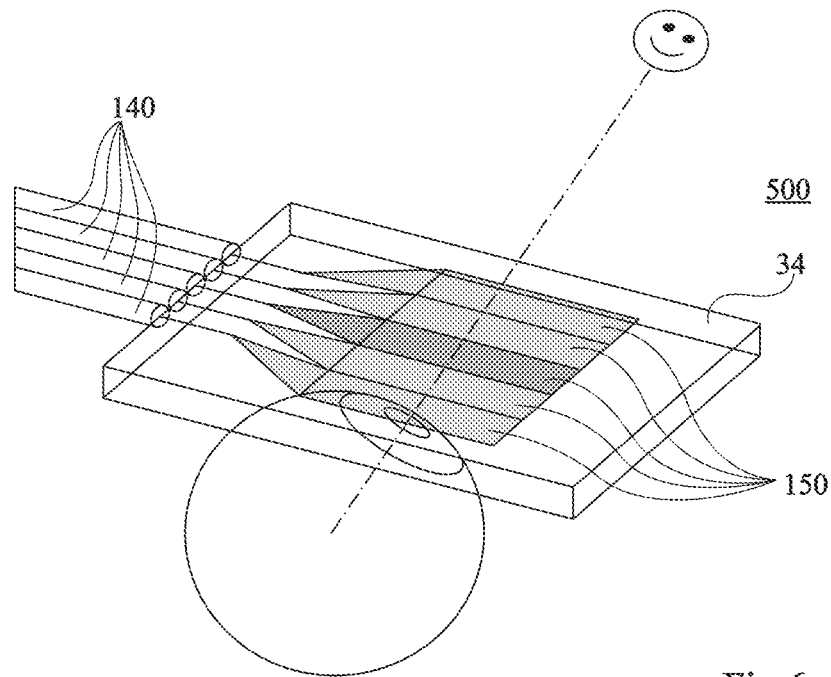
FIG. 6 is a perspective view illustrating an alternative embodiment of the image projection device of FIG. 5.
Figure 7:
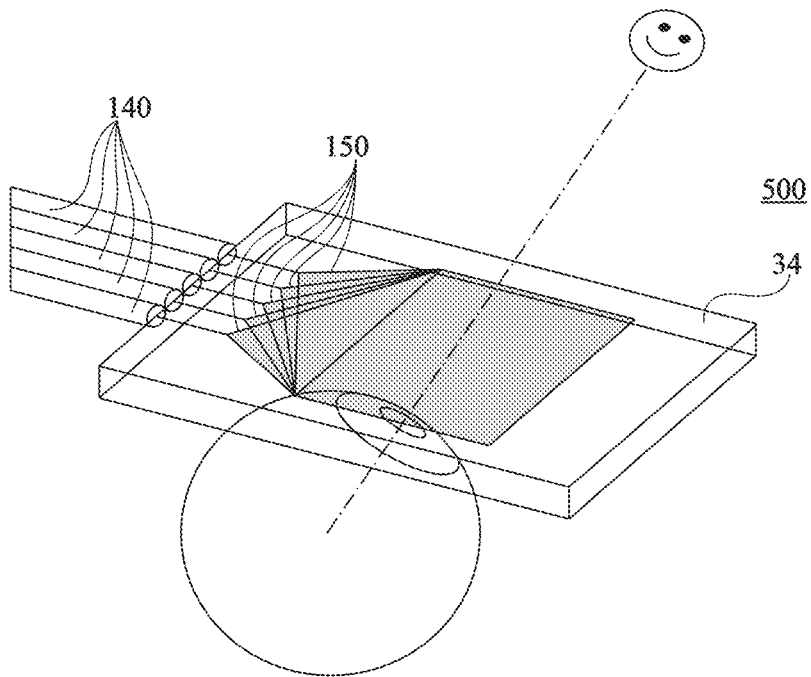
FIG. 7 is a perspective view illustrating another alternative embodiment of the image projection device of FIG. 5.

FIGS. 6 and 7 are perspective views illustrating alternative embodiments of the device 500 of FIG. 5.

In each of these two variants, devices 500 comprises a plurality (five in the shown example) of individually-controllable laser sources 140, each supplying a specific network 150 of one or a plurality of waveguides $102_i$. In FIGS. 6 and 7, the waveguides $102_i$, as well as the extraction cells $104_{ij}$ and the holographic orientation elements $130_{ij}$ coupled to each waveguide $102_i$, are not detailed. Each waveguide network 150 enables, when the corresponding laser source 140 is on, to project, via extraction cells $104_{ij}$ and the corresponding holographic elements $130_{ij}$, an image (or a pictogram) prerecorded on manufacturing of the device. Thus, the devices of FIGS. 6 and 7 enable to simultaneously or sequentially project one or a plurality of images among a plurality (five in the shown example) of prerecorded images.

In the example of FIG. 6, the different waveguide networks 150 are arranged next to one another. In this case, the user's eye should slightly displace to view at best each projected image.

In the example of FIG. 7, the different waveguide networks 150 are interlaced and each extend over substantially the entire surface of the substrate. This enables to improve the image perception. This embodiment is however more complex since the guides $102_i$ of the different networks 150 should not cross. As an example, guides $102_i$ may be coil- and/or spiral-shaped to enable to cover the surface of the device without crossing.

Another example of application capable of taking advantage of a distributed light projection device of the type described in relation with FIGS. 1 to 3 concerns the field of OPA-type emitters ("Optical Phased Array"), particularly used in LIDAR systems ("Light Detection And Ranging").

Figure 8:
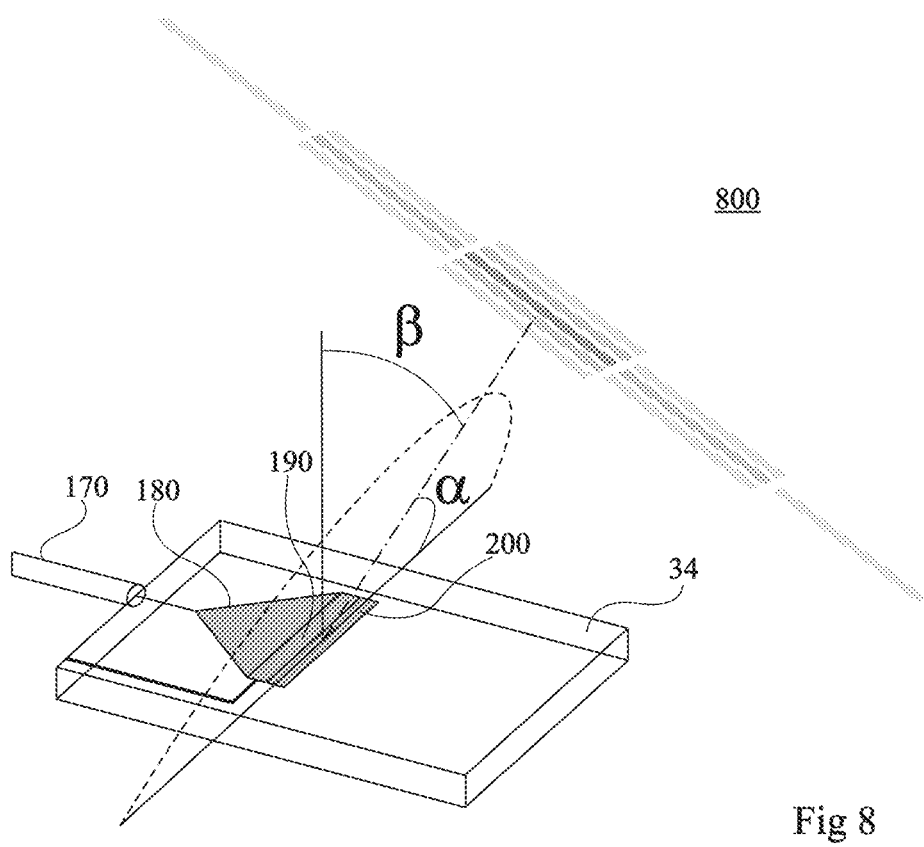
FIG. 8 is a perspective view schematically illustrating an example of an optical phase control grating.

FIG. 8 is a perspective view very schematically illustrating an example of an OPA-type device 800.

Device 800 comprises an assembly 180 of waveguides (not detailed), for example, parallel to one another, supplied by a same laser source 170. These guides are coupled to a controllable device 190 to modify the phase of the light propagating in each of the guides. Device 190 for example introduces a linear phase shift between successive guides.

The light is then extracted from the guides, towards the free space, in an extraction area 200 located downstream of phase-shift device 190.

In the same way as a beam crossing a prism is deviated according to an angle proportional to the angle of the prism, the introduction of a linear slope on the phase generates on the beam extracted from the guides a far-field angular deviation. The higher the number of guides, the better the accuracy on the value of the slope of the phase will be, and the better the accuracy of the angular deviation will be. However, when the light extraction area is short (that is, has a small dimension in the longitudinal direction of the guides), the increase in the number of guides results in obtaining an emission area of elongated shape, for example, in the shape of a line. In far field, the light signal extracted from the device then resembles a diffraction pattern of a slot, such as schematically illustrated in FIG. 8.

In FIG. 8, the diffraction angle at the output of the extraction area has been noted β, and the adjustable deflection angle introduced by phase modification device 190 has been noted α. The beam may be angularly deviated by the modifying of the phase via device 190. In the field of LIDARs, this particularly enables to scan the optical beam to achieve a mapping of the environment of an object, for example, a vehicle.

The strong dissymmetry of the beam linked to the elongated shape of light extraction area 200 may be disturbing, for example, when a second deflection is introduced by another element, for example, a mobile mirror in direction β. The resolution is then degraded in this direction. It would thus be preferable to obtain a symmetrical diffracted beam which is the smallest possible in far field.

Figure 9:
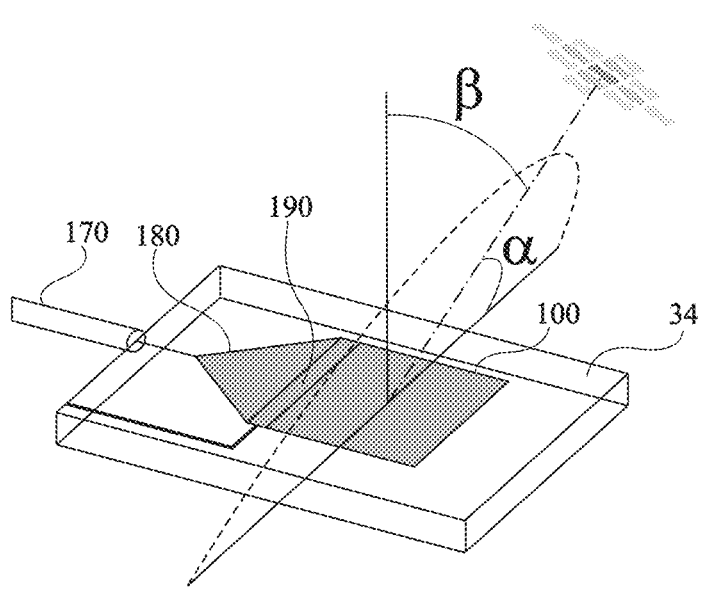
FIG. 9 is a perspective view schematically illustrating an example of an optical phase control grating using a distributed light projection device of the type described in relation with FIGS. 1 to 3.

FIG. 9 is a perspective view schematically illustrating an example of an OPA-type device 900 using a distributed light projection device of the type described in relation with FIGS. 1 to 3.

The device 900 of FIG. 9 differs from the device 800 of FIG. 8 essentially in that, in the example of FIG. 9, the extraction area 200 of the device of FIG. 8, having a relatively short length, has been replaced with an extensive extraction area 210 formed by a distributed light projection device of the type described in relation with FIGS. 1 to 3. As an example, the dimension of the extraction area in the longitudinal direction of the guides is selected to be of the same order of magnitude as its transverse dimension, to obtain an extraction area of generally square shape. The extraction cells 104$_{ij}$ of the device (not detailed in FIG. 9) may be selected to obtain a substantially uniform output intensity all over the surface of the extraction area, or preferably, an output intensity following a Gaussian variation over the surface of the extraction area, to avoid or limit secondary far field intensity peaks.

As illustrated in FIG. 9, the diffraction is significantly decreased in direction 3 with respect to the embodiment of FIG. 8. This enables to improve the accuracy of the angular scanning.

Various embodiments and variants have been described. Those skilled in the art will understand that certain features of these embodiments can be combined and other variants will readily occur to those skilled in the art. In particular, the described embodiments are not limited to the examples of dimensions and of materials mentioned in the present disclosure. Further, the described embodiments are not limited to the examples of uses of the distributed light projection device mentioned in the present disclosure.

Finally, the practical implementation of the described embodiments and variations is within the abilities of those skilled in the art based on the functional indications given hereabove. In particular, on reading of the present disclosure, it will be within the abilities of those skilled in the art to implement the sizing and the manufacturing of the distributed projection device by using usual integrated optical device simulation and/or manufacturing tools.

The invention claimed is:

1. A distributed light projection device, comprising:
a plurality of waveguides; and
above each waveguide of the plurality of waveguides, a plurality of extraction cells coupled to distinct portions of each waveguide, each extraction cell in the plurality of extraction cells comprising stacked first and second diffraction gratings,
wherein the first and second diffraction gratings within each extraction cell in the plurality of extraction cells are offset by a position offset value and different extraction cells in the plurality of extraction cells have different position offset values between the first and second diffraction gratings, whereby the different extraction cells have different extraction coefficients;
wherein each waveguide of the plurality of waveguides is a monomode waveguide;
wherein, in each extraction cell, the first and second diffraction gratings have a same pitch;
wherein the second diffraction grating extends above at least one portion of the first diffraction grating and covers the at least one portion of the first diffraction grating;
wherein the extraction coefficient comprises a percentage of guided light extracted by each extraction cell; and
wherein each extraction cell is formed apart in a horizontal plane.

2. The distributed light projection device according to claim 1, wherein, for each waveguide of the plurality of waveguides, the different extraction cells coupled to the waveguide have the position offset values between the first and second diffraction gratings decreasing as a distance to an input end of the waveguide increases, such that the different extraction cells have extraction coefficients increasing as the distance to the input end of the waveguide increases.

3. The distributed light projection device according to claim 1, wherein:
the first and second diffraction gratings of an extraction cell of a waveguide of the plurality of waveguides laterally extend above at least one other waveguide of the plurality of waveguides and form an extraction cell of the at least one other waveguide, and
each distinct portion of the waveguide includes an area of a respective surface of each of the plurality of waveguides.

4. An image projection device, comprising the distributed light projection device according to claim 1, and, opposite each extraction cell of the distributed light projection device, a holographic element for orienting light extracted by the extraction cell.

5. An optical phase-control network comprising the distributed light projection device according to claim 1 and, upstream of the distributed light projection device, a device for modifying the phase of light injected into each waveguide of the distributed light projection device.

6. The distributed light projection device according to claim 1, wherein the first and second diffraction gratings of each extraction cell are formed of strips of material.

7. The distributed light projection device according to claim 1, further comprising a layer separating the first and second diffraction gratings of each extraction cell.

8. The distributed light projection device according to claim 1, further comprising at least one laser source having a controllable intensity configured to inject a light beam into each waveguide.

9. The distributed light projection device according to claim 3, wherein the plurality of waveguides are located in a same plane parallel to a surface of a substrate comprising the horizontal plane, and wherein the plurality of waveguides extend over at least a portion of the substrate.

10. The distributed light projection device according to claim 3, wherein the respective surface of each of the plurality of waveguides is arranged spaced apart in the horizontal plane in a first direction.

11. The image projection device according to claim 4, further comprising, opposite each extraction cell, a controllable element for activating or deactivating the extraction cell.

12. The image projection device according to claim 4, comprising no controllable elements for activating or deactivating the extraction cells.

13. The distributed light projection device according to claim 6, wherein each position offset value comprises a distance between a first edge of a first strip and a second edge of a second strip of the strips of material.

14. The distributed light projection device according to claim 6, wherein the strips of material have a same width.

15. The distributed light projection device according to claim 10, wherein each area is spaced apart in the horizontal plane in a second direction.

16. The distributed light projection device according to claim 15, wherein the stacked first and second diffraction gratings are stacked in a vertical plane perpendicular to the horizontal plane.

17. A distributed light projection device, comprising:
one waveguide; and
above the waveguide, a plurality of extraction cells coupled to distinct portions of the waveguide, each extraction cell in the plurality of extraction cells comprising stacked first and second diffraction gratings,
wherein the first and second diffraction gratings within each extraction cell in the plurality of extraction cells are offset by a position offset value and different extraction cells in the plurality of extraction cells have different position offset values between the first and second diffraction gratings, whereby the different extraction cells have different extraction coefficients;
wherein the waveguide is a monomode waveguide;
wherein, in each extraction cell, the first and second diffraction gratings have a same pitch;
wherein the second diffraction grating extends above at least one portion of the first diffraction grating and covers the at least one portion of the first diffraction grating;
wherein the extraction coefficient comprises a percentage of guided light extracted by each extraction cell; and
wherein each extraction cell is formed apart in a horizontal plane.

\* \* \* \* \*